(12) United States Patent
Flannery et al.

(10) Patent No.: US 11,066,870 B1
(45) Date of Patent: Jul. 20, 2021

(54) BARRIER HAVING UPSIDE DOWN JOINT

(71) Applicant: Regalo International, LLC, Longboat Key, FL (US)

(72) Inventors: Mark A. Flannery, Longboat Key, FL (US); Gary T. Schultze, Savage, MN (US); Michael P. Lane, Chaska, MN (US)

(73) Assignee: Regalo International, LLC, Longboat Key, FL (US)

( * ) Notice: Subject to any disclaimer, the term of this patent is extended or adjusted under 35 U.S.C. 154(b) by 213 days.

(21) Appl. No.: 16/203,371

(22) Filed: Nov. 28, 2018

Related U.S. Application Data

(60) Provisional application No. 62/607,672, filed on Dec. 19, 2017.

(51) Int. Cl.
*E06B 9/00* (2006.01)
*E06B 9/06* (2006.01)

(52) U.S. Cl.
CPC .......... *E06B 9/0669* (2013.01); *E06B 9/0638* (2013.01); *E06B 2009/002* (2013.01)

(58) Field of Classification Search
CPC ............. E06B 2009/002; E06B 9/0669; E06B 9/0638; E06B 11/00; E06B 9/04; E05D 7/04; E05D 7/0423; Y10T 16/54024; Y10T 16/540255; Y10T 16/54028; Y10T 403/32368

USPC ............................ 49/50, 55, 56; 256/26, 27
See application file for complete search history.

(56) References Cited

U.S. PATENT DOCUMENTS

| | | | | |
|---|---|---|---|---|
| 5,123,768 | A * | 6/1992 | Franklin | A46B 5/0075 403/84 |
| 5,774,967 | A * | 7/1998 | Greve | B25B 5/08 29/235 |
| 6,595,498 | B1 * | 7/2003 | Andersen | E06B 9/04 256/24 |
| 7,552,513 | B2 * | 6/2009 | Cheng | E06B 9/04 16/264 |
| 7,887,029 | B2 | 2/2011 | Flannery | |
| 2007/0210293 | A1 * | 9/2007 | Cheng | E04H 17/18 256/26 |
| 2015/0101461 | A1 * | 4/2015 | Li | B25G 1/063 81/438 |

\* cited by examiner

*Primary Examiner* — Katherine W Mitchell
*Assistant Examiner* — Jeremy C Ramsey

(57) ABSTRACT

The present barrier includes barrier portions engaged to each other by a junction apparatus that includes first and second upper connectors and first and second lower connectors. A junction support member extends between the upper connectors and lower connectors. The junction support member is spaced from and adjacent to the upper connectors. A bridge connector bridges the spacing between the upper end of the junction support member and the upper connectors.

12 Claims, 13 Drawing Sheets

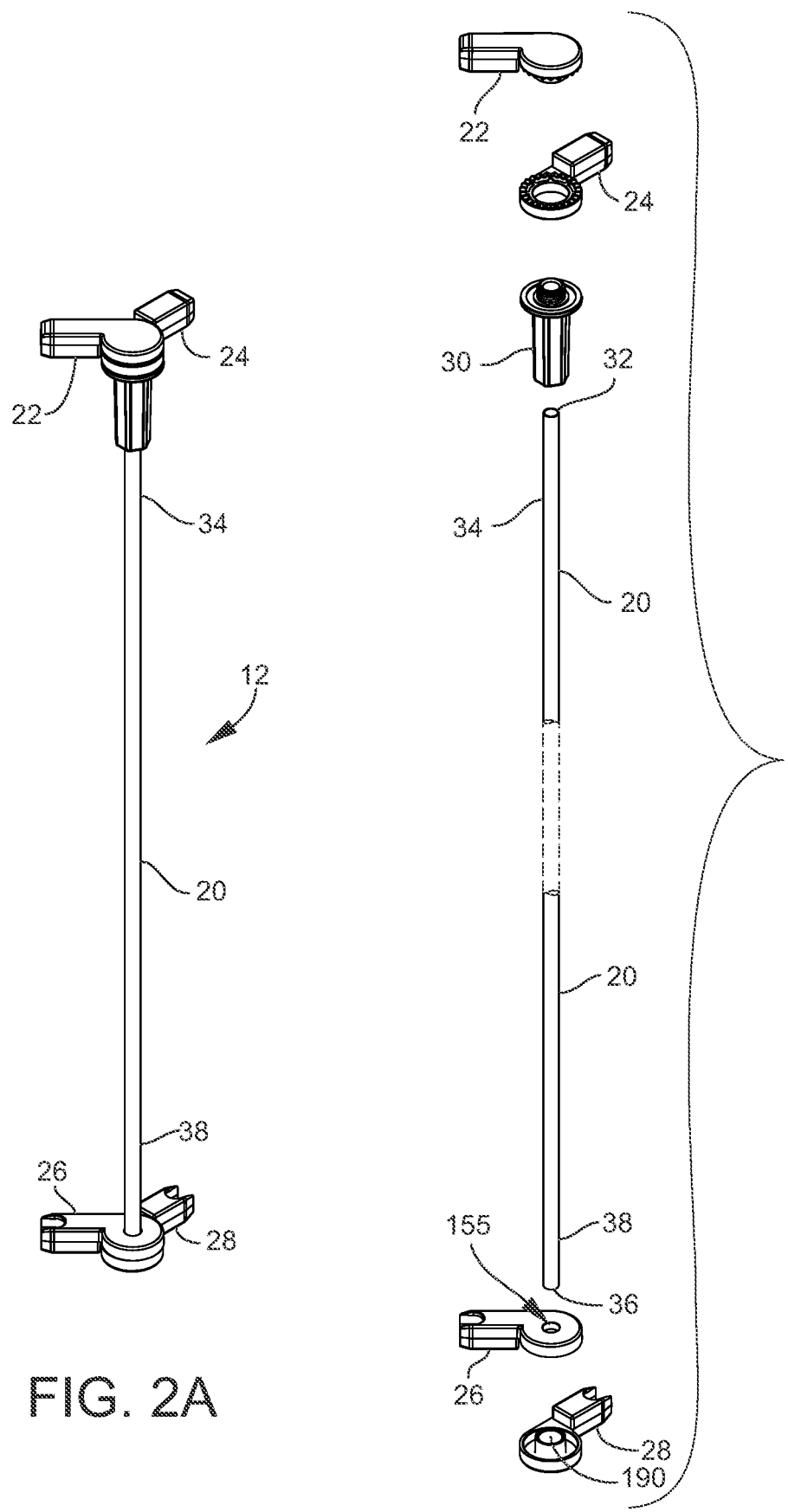

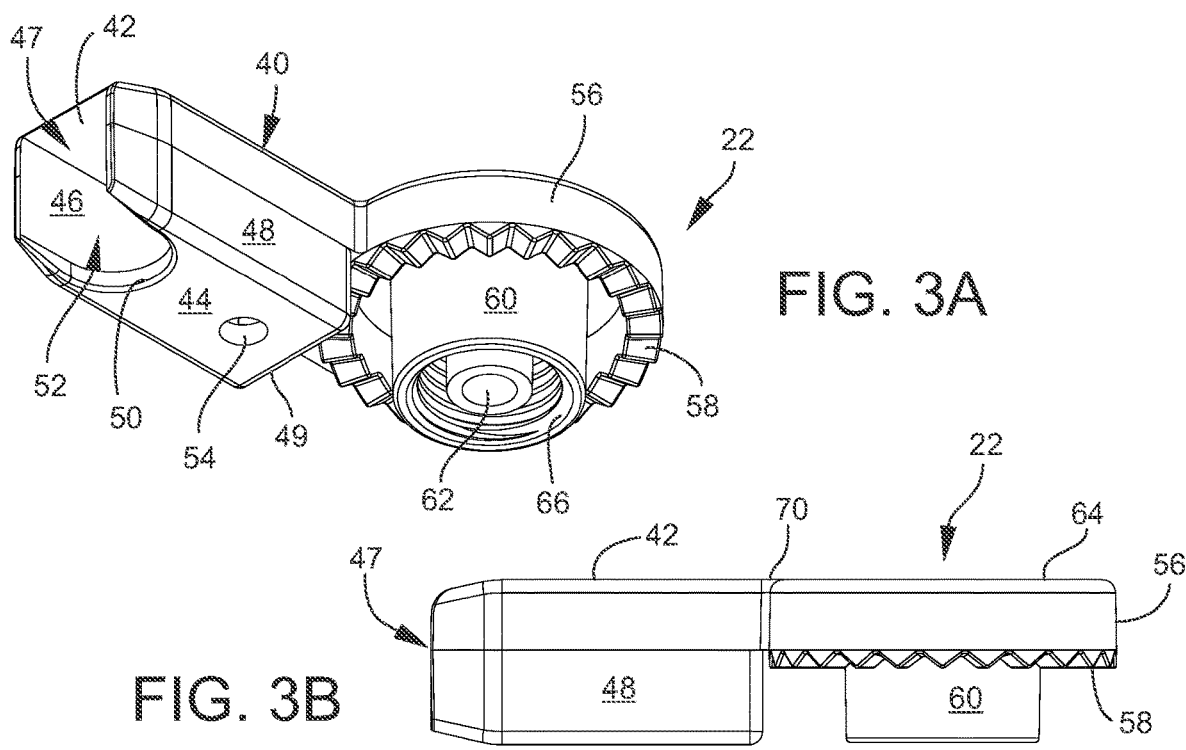
FIG. 3A
FIG. 3B
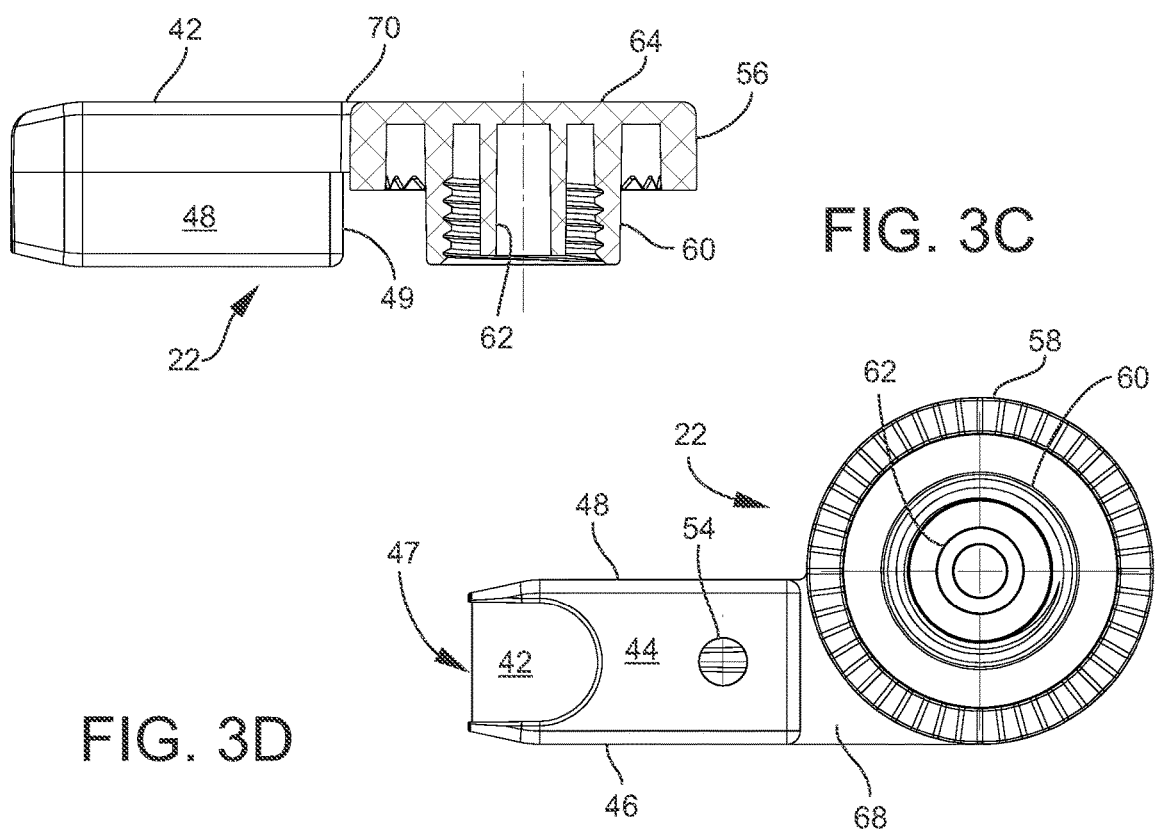
FIG. 3C
FIG. 3D

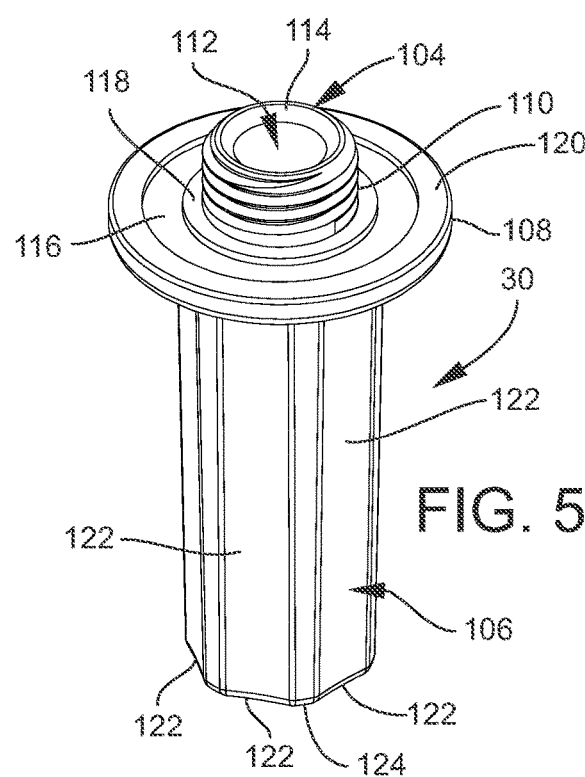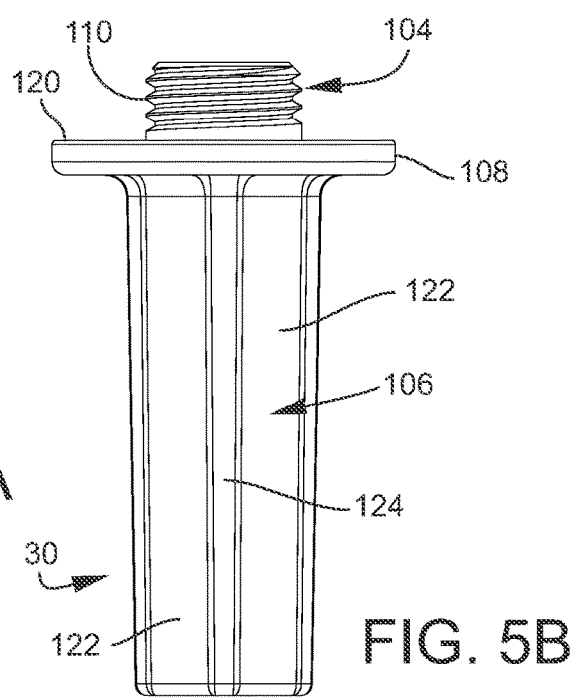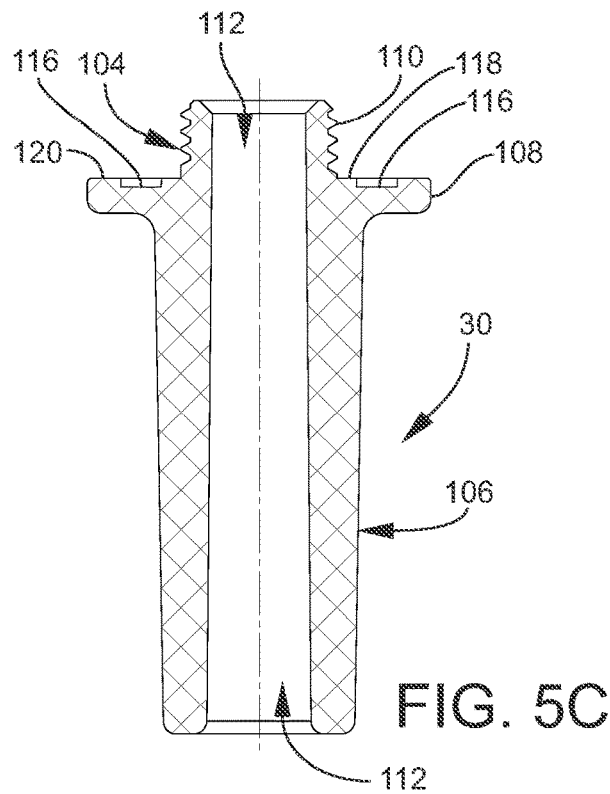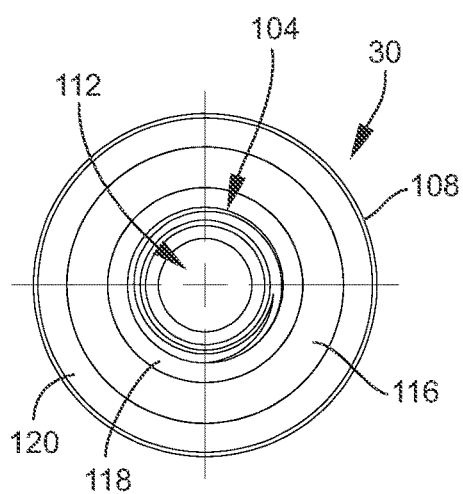

BARRIER HAVING UPSIDE DOWN JOINT

This application claims the benefit under 35 U.S.C. 119(e) of U.S. Provisional Patent Application No. 62/607,672 filed Dec. 19, 2017, which application is hereby incorporated by reference in its entirety into this application.

FIELD OF THE INVENTION

The present invention relates to a barrier having an internal support member between end members, where the internal support member is removable with minimal interference with the end members.

BACKGROUND OF THE INVENTION

A support member for a barrier may be like a suspension system on a conventional automobile, where there is a driver's side front wheel on one end of the suspension system and a passenger's side front wheel on the other end of the suspension system. To gain axis to certain parts of the suspension system, one or both of the driver's side and passenger's side wheels may need to be removed. Likewise, to gain access to or remove a support member for a conventional barrier, end systems or end apparatus must first be removed to then remove the support member.

SUMMARY OF THE INVENTION

A feature of the present invention is the provision in a barrier, of a first barrier portion, of a second barrier portion, and of a junction apparatus engaging the first and second barrier portions to each other, where the junction apparatus includes a first upper connector engaged to the first barrier portion, a second upper connector engaged to the second barrier portion, with the first and second upper connectors being pivotally engaged to each other.

Another feature of the present invention is the provision in such a barrier, of a first lower connector engaged to the first barrier portion, of a second lower connector engaged to the second barrier portion, with the first and second lower connectors being pivotally engaged to each other.

Another feature of the present invention is the provision in such a barrier of a junction support member between the first and second upper connectors and the first and second lower connectors, where the junction support member includes an upper end and a lower end, and where the upper end of the junction support member is spaced from and adjacent to the first and second upper connectors.

Another feature of the present invention is the provision in such a barrier, of a bridge connector axially receiving the junction support member, where the bridge connector extends from the junction support member to the first and second upper connectors.

Another feature of the present invention is the provision in such a barrier, of the first upper connector including a first set of teeth and of the second upper connector including a second set of teeth, where each of the first and second sets of teeth are annularly arranged, where the first and second sets of teeth interact with each other such that, when the first and second sets of teeth are pivoted relative to each other, the first and second barrier portions are set at different angles relative to each other.

Another feature of the present invention is the provision in such a barrier, of the second upper connector being pinchable between the first upper connector and the bridge connector to fix the first and second upper connectors to each other to minimize pivotal movement between the first and second upper connectors.

Another feature of the present invention is the provision in such a barrier, of the bridge connector being turnable into the first upper connector to pinch the second upper connector between the first upper connector and the second upper connector to fix the first and second upper connectors to each other to minimize pivotal movement between the first and second upper connectors.

Another feature of the present invention is the provision in such a barrier, of the bridge connector including first and second end portions and a radially extending face between the end portions, one end portion comprising a threaded bridge portion, wherein the second connector comprises an opening, and wherein the first connector comprises a first connector threaded portion, the threaded bridge portion being insertable through the opening of the second connector and into turnable engagement with the first connector threaded portion, the radially extending face and the first upper connector pinching the second upper connector therebetween to fix the first and second upper connectors to each other to minimize pivotal movement between the first and second upper connectors.

Another feature of the present invention is the provision in such a barrier, of the second end portion of the bridge connector including a hand grip for turning the bridge connector into and out of the first upper connector, with the hand grip having an axial length about a width of a hand of an adult.

Another feature of the present invention is the provision in such a barrier, of the axial length of the hand grip being greater than an axial length from the radially extending face to a terminal end of said threaded bridge portion.

Another feature of the present invention is the provision in such a barrier, of the hand grip being roughened to minimize slippage of a human hand turning the hand grip.

Another feature of the present invention is the provision in such a barrier, of the hand grip including a set of axially extending grooves spaced apart about the hand grip to minimize slippage of a human hand turning the hand grip.

Another feature of the present invention is the provision in such a barrier, of the junction support member including first and second ends, where the second end is seated in one of the first and second lower connectors, where the first end is spaced from the second upper connector that is pinchable between the first upper connector and the bridge connector such that, when the bridge connector is disengaged from the first upper connector, the junction support member can be disengaged from the barrier.

Another feature of the present invention is the provision in such a barrier, of the junction support member including first and second ends, where the second end is seated in one of the first and second lower connectors, where the first end is disengaged from each of the first and second upper connectors when the bridge connector is engaged to the first upper connector, where the first end is disengaged from each of the first and second upper connectors when the bridge connector is disengaged from the first upper connector such that, when the bridge connector is disengaged from the first upper connector, the junction support member can be disengaged from the barrier.

Another feature of the present invention is the provision in such a barrier, of the junction support member including first and second ends, where the second end is seated in one of the first and second lower connectors, where the first end is disengaged from each of the first and second upper connectors at all times such that, when the bridge connector is disengaged from the first upper connector, the junction support member can be disengaged from the barrier.

Another feature of the present invention is the provision in such a barrier, of the junction support member including a tube.

Another feature of the present invention is the provision in such a barrier, of one of the first and second lower connectors having a seat for the second end of the junction support member, where the seat is cylindrical, and where the seat is disposed in a cylindrical portion of the other of the first and second lower connectors.

Another feature of the present invention is the provision in such a barrier, of the first barrier portion including a) a set of generally vertical first support members where each of the generally vertical first support members includes a first upper end portion and a first lower end portion, b) a first upper transverse support member engaging the first upper end portions, and c) a first lower transverse support member engaging the first lower end portions.

Another feature of the present invention is the provision in such a barrier, of the second barrier portion including a) a set of generally vertical second support members where each of the generally vertical second support members having a second upper end portion and a second lower end portion, b) a second upper transverse support member engaging the second upper end portions, and c) a second lower transverse support member engaging the second lower end portions.

Another feature of the present invention is the provision in such a barrier, of the first upper transverse support member of the first barrier portion engaging the first upper connector of the junction apparatus, of the second upper transverse support member of the second barrier portion engaging the second upper connector of the junction apparatus, of the first lower transverse support member of the first barrier portion engaging the first lower connector of the junction apparatus, and of the second lower transverse support member of the second barrier portion engaging the second lower connector of the junction apparatus.

Another feature of the present invention is the provision in a barrier, of a first barrier portion, of a second barrier portion, and of a junction apparatus engaging the first and second barrier portions to each other, where the junction apparatus includes a) a first upper connector engaged to the first barrier portion, b) a second upper connector engaged to the second barrier portion, with the first and second upper connectors being pivotally engaged to each other, c) a first lower connector engaged to the first barrier portion, d) a second lower connector engaged to the second barrier portion, with the first and second lower connectors being pivotally engaged to each other, e) a tube between the upper connectors and the lower connectors, where the tube includes an upper end and a lower end, where the upper end of the tube is spaced from first and second upper connectors, where the lower end of the tube is seated in one of the first and second lower connectors, and f) a bridge between the upper end of the tube and one of the first and second upper connectors, with the bridge being removable from such one of the first and second upper connectors, with the upper end of the tube being spaced from the first and second upper connectors when the bridge is engaged to such one of the first and second upper connectors.

Another feature of the present invention is the provision in such a barrier, of the bridge axially receiving the tube and where the bridge threadingly engages such one of the first and second upper connectors.

Another feature of the present invention is the provision in such a barrier, of when the bridge is removed from such one of the first and second upper connectors the tube is tiltable relative to such one of the first and second lower connectors.

Another feature of the present invention is the provision in such a barrier, of when the bridge is removed from such one of the first and second upper connectors the tube is liftable out of such one of the first and second lower connectors.

Another feature of the present invention is the provision in such a barrier, of such lower end of the tube including a cylindrical portion, where such one of the first and second lower connectors includes a cylindrical portion, and where such cylindrical portion of the lower end of the tube is seated in the cylindrical portion of such one of the first and second lower connectors.

An advantage of the present invention is that an internal support member is removable from the barrier with minimal interference with the upper and lower portions of the barrier.

Another advantage of the present invention is that, even though the internal support member is removable, the internal support member is just as strong in the horizontal or transverse or sideways direction as a conventional internal support member.

Another advantage of the present invention is that the mechanism providing for the removal of the internal support member is simple to manufacture.

Another advantage of the present invention is that the mechanism providing for the removal of the internal support member is inexpensive to manufacture.

Another advantage of the present invention is that the mechanism providing for the removal of the internal support member is simple and easy to use for the end user.

Another advantage of the present invention is that, after the internal support member has been removed, the barrier maintains its shape and operability, albeit with one less internal support member. One feature contributing to this advantage is that the bridge connector may be slid off the internal support member and reengaged to the first and second upper connectors without being engaged on the internal support member.

Another advantage is that the internal support member is, after removal, readily re-engagable with the barrier with minimal interference with the upper and lower portions of the barrier.

BRIEF DESCRIPTION OF THE DRAWINGS

FIG. 2A is a perspective assembled view of a junction apparatus of the barrier of FIG. 1A.

FIG. 2B is a perspective broken apart or exploded view of the junction apparatus of FIG. 2A.

FIG. 3A is a perspective view of the first upper connector of the junction apparatus of FIG. 2A.

FIG. 3B is a side view of the first upper connector of FIG. 3A.

FIG. 3C is a side, partially section view of the first upper connector of FIG. 3A.

FIG. 3D is a bottom view of the first upper connector of FIG. 3A.

FIG. 5A is a perspective view of the bridge connector of the junction apparatus of FIG. 2A.

FIG. 5B is a side view of the bridge connector of FIG. 5A.

FIG. 5C is a side section view of the bridge connector of FIG. 5A.

FIG. 5D is a bottom view of the bridge connector of FIG. 5A.

DESCRIPTION

Figure 1A:
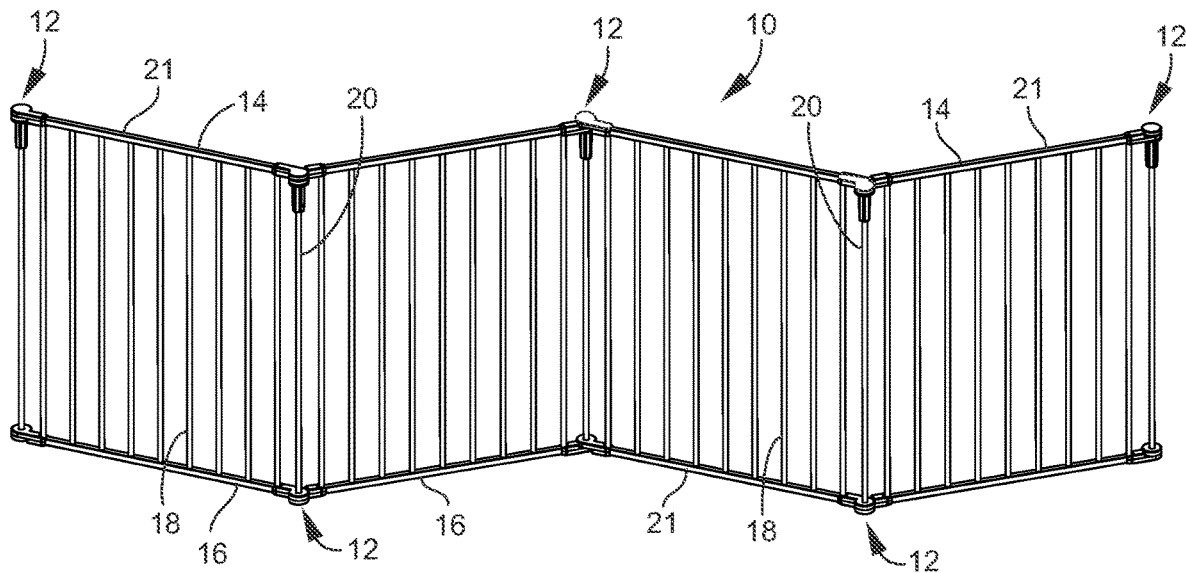
FIG. 1A is a perspective view of the present barrier having the upside down joint, where the barrier is in a folded out or extended configuration.

As shown in FIG. 1A, a barrier is indicated by the reference number 10. Barrier 10 includes a set of five junction apparatus 12. The barrier 10 includes a set of four upper transverse support members 14, a set of four lower transverse support members 16, and a set of thirty-six generally vertical support members 18 engaged between opposing upper and lower transverse support members 14, 16. Each of the junction apparatus 12 includes a generally vertical junction support member 20.

Barrier 10 includes four panels 21. Each of the panels 21 is formed or defined by two opposing junction apparatus 12, one upper transverse support member 14, and one lower transverse support member 16 that opposes such upper transverse support member 14. Each of the panels 21 defines a plane. The four panels 21 fold or pivot or rotate from the folded out or extended configuration shown in FIG. 1A to the folded in or retracted configuration shown in FIG. 1B where the panels 21 are back to back relative to each other and where the planes of such panels 21 are parallel to each other.

The panels 21 pivot about the junction apparatus 12. In the folded position in FIG. 1B, upper transverse support members 14 that share a junction apparatus 12 are adjacent to each other along their lengths. In the folded position in FIG. 1B, lower transverse support members 16 that share a junction apparatus 12 are adjacent to each other along their lengths. Each of the panels 21 includes a set of nine generally vertical support members 18. Within each of the panels 21, the generally vertical support members 18 are spaced apart equidistant from each other.

The upper transverse support members 14 are tubular. The lower transverse support members 16 are tubular. The generally vertical junction support members 20 are tubular. The generally vertical support members 18 are tubular.

The upper transverse support members 14 extend generally horizontally. The lower transverse support members 16 extend generally horizontally.

In FIG. 1A, the angle of one panel 21 relative to an immediately adjacent panel 21 may be an acute angle (less than ninety degrees), an obtuse angle (more than ninety degrees), or a right angle (ninety degrees). In FIG. 1A, the angle of one panel 21 relative to an immediately adjacent panel 21 may be described as being a) an oblique angle (anything but a right angle), or b) a right angle. Immediately adjacent panels 21 may, if desired, be set at 180 degrees relative to each other such that immediately adjacent upper transverse support members 14 are in a straight line with each other and such that immediately adjacent lower transverse support members 16 are in a straight line with each other.

FIGS. 2A and 2B show the junction apparatus 12 and junction support member 20. Junction apparatus 12 further includes a first upper connector 22 for engaging one upper transverse support member 14, a second upper connector 24 for engaging an adjacent upper transverse support member 14, a first lower connector 26 for engaging one lower transverse support member 16, and a second lower connector 28 for engaging an adjacent lower transverse support member 16. Junction apparatus 12 further includes a bridge connector 30.

Junction support member 20 includes an upper end 32 and an upper end portion 34. Junction support member 20 further includes a lower end 36 and a lower end portion 38. Upper end 32 is an absolute upper end. Lower end 36 is an absolute lower end. Junction support member 20 is a tube. Lower end portion 38 of junction support member 20 forms the shape of a cylinder. Junction support member 20 as a whole forms the shape of a cylinder.

Figure 8:
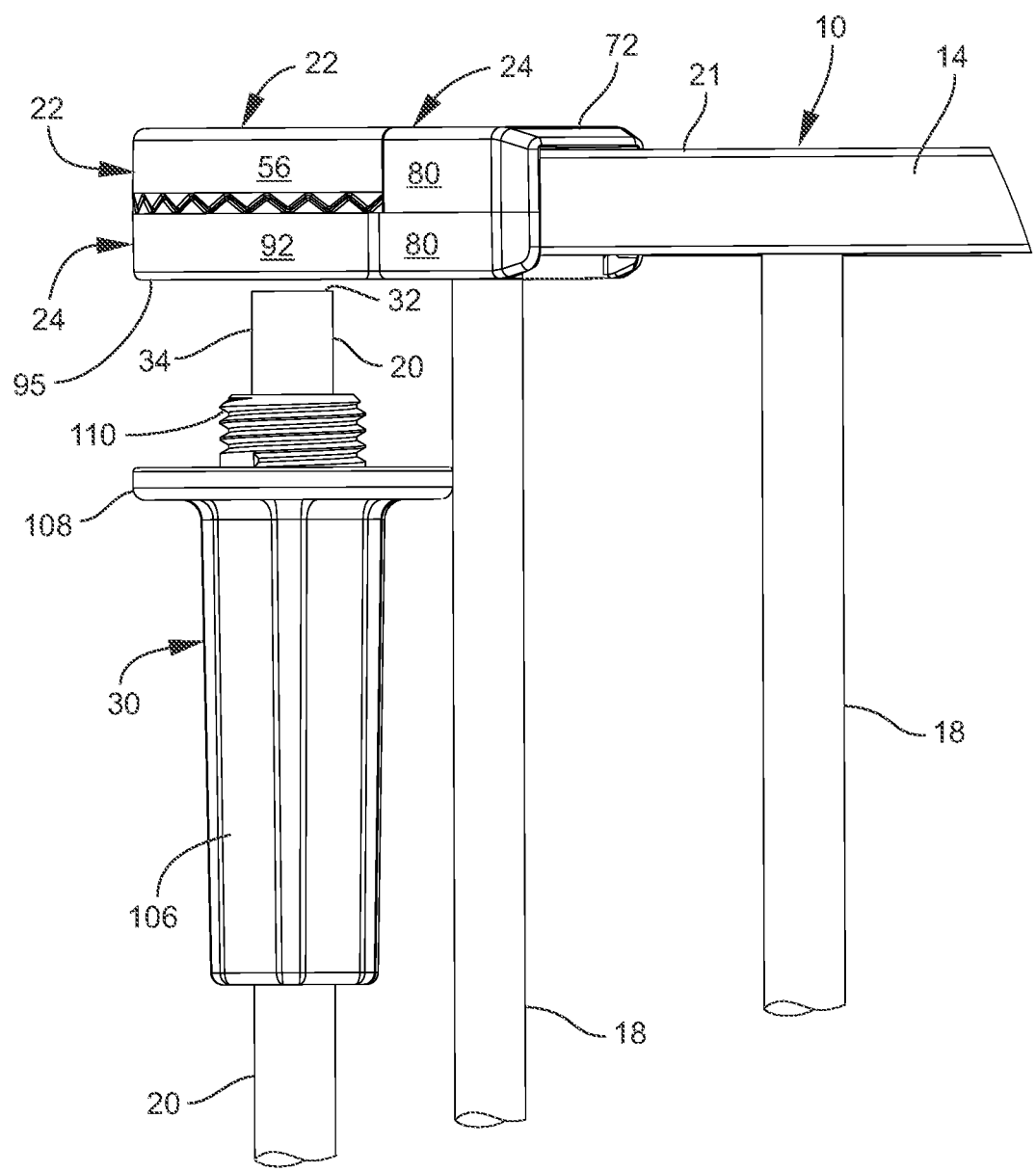
FIG. 8 is a side view of a top portion of the junction apparatus of FIG. 2A, showing the bridge connector disengaged from the first and second upper connectors, and further showing that the upper end of the tube of the junction apparatus is spaced from the first and second upper connectors.
Figure 13:
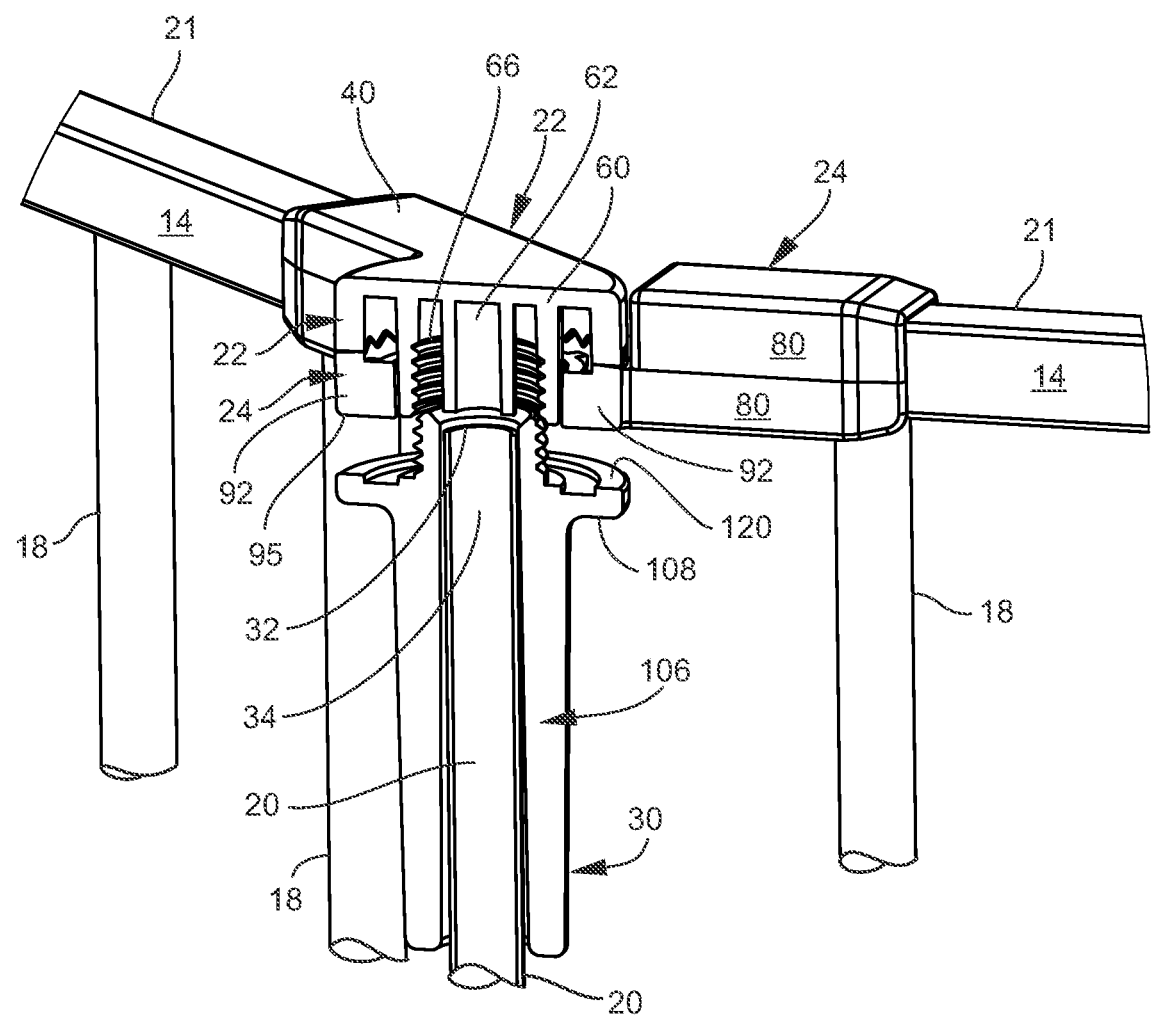
FIG. 13 is a front, partially section view of a top portion of the junction apparatus of FIG. 2A, showing the bridge connector disengaged from the first and second upper connectors, and further showing that the upper end of the tube of the junction apparatus is spaced from the first and second upper connectors.

In the assembled view of FIG. 2A, the upper end 32 of the junction support member 20 is adjacent to and spaced from the first and second upper connectors 22, 24. This spacing is shown in FIGS. 8 and 13. The bridge connector 30 bridges the space from the upper end 32 of the junction support member 20 to the first and second upper connectors 22, 24.

Figure 9:
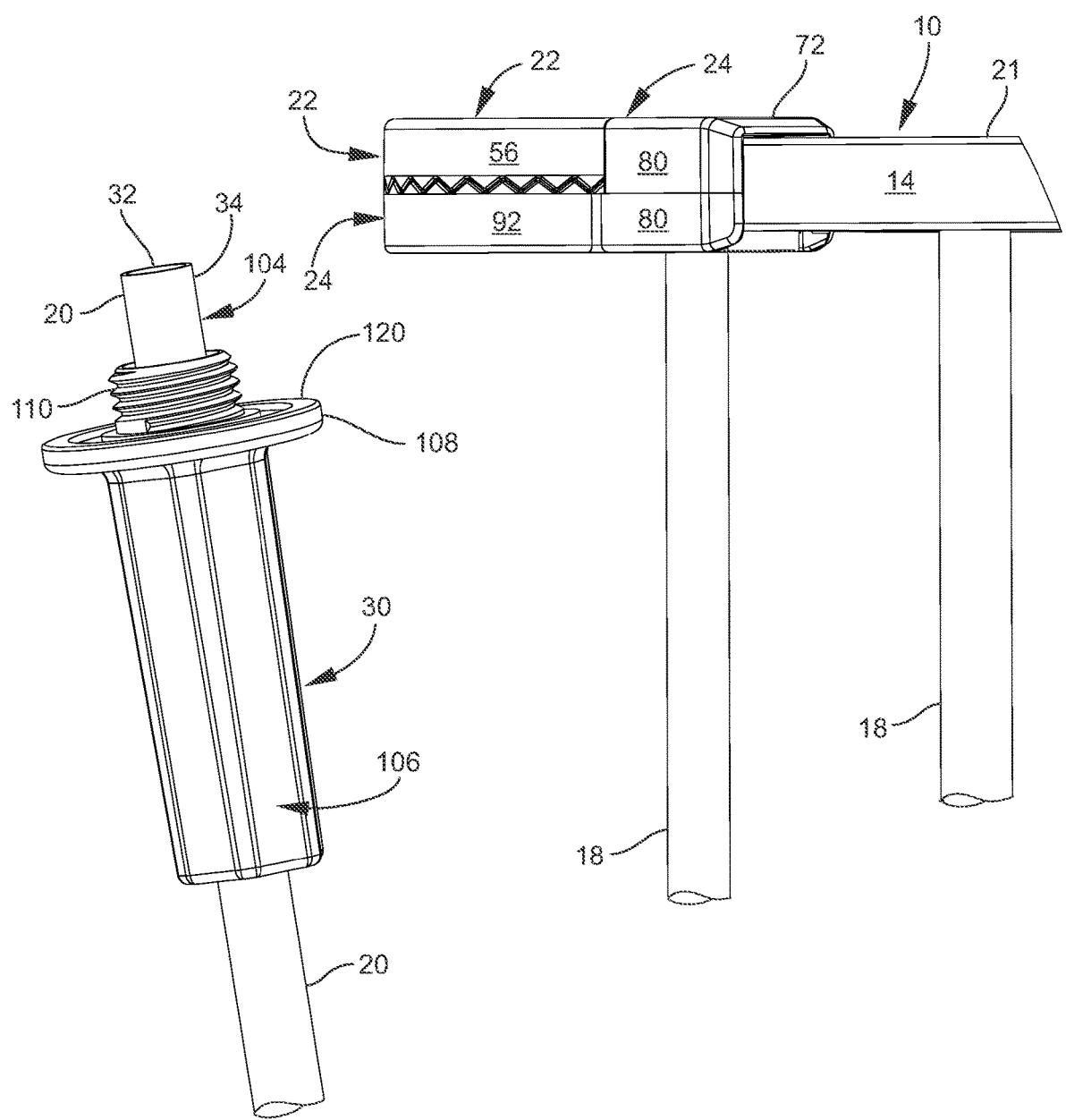
FIG. 9 is a side view of a top portion of the junction apparatus of FIG. 2A, showing the bridge connector disengaged from the first and second upper connectors, and further showing that the upper end of the tube of the junction apparatus being tilted away from the first and second upper connectors.

When the bridge connector 30 is screwed out of the first upper connector 22 and withdrawn from the second upper connector 24, the bridge connector 30 and junction support member 20 can be tilted away from the first and second upper connectors 22, 24 as shown in FIG. 9. Then the lower end 36 of the junction support member 20 can be lifted out of the first lower connector 26, whereupon the junction support member 20 has been separated from the junction apparatus 12 and the barrier 10.

FIGS. 3A, 3B, 3C and 3D show the first upper connector 22. First upper connector 22 includes a receptor portion 40 for receiving an end portion of the upper transverse support member 14. Receptor portion 40 includes a top 42, bottom 44, tangential sidewall 46, center sidewall 48, and an end wall 49 that serves as a stop for the end portion of the upper transverse support member 14. Opposite of end wall 49, end surfaces of sidewalls 46, 48, and top wall 42 are tapered such that the sidewalls 46, 48, and top wall 42 lead in gradually to the sidewalls and top wall of the upper transverse support member 14. Opposite of end wall 49, such tapered end surfaces of receptor portion 40 form an opening 47 for receiving the end portion of the upper transverse support member 14. Bottom 44 includes a U-shaped edge 50 that forms a U-shaped recess 52 for receiving one of the generally vertical support members 18. U-shaped recess 52 communicates with opening 47. Bottom 44 further includes an inset pin hole 54 for receiving a pin such as a set pin for engaging the end portion of the upper transverse support member 14 so as to fix the upper connector 22 to the upper transverse support member 14.

First upper connector 22 includes a receptacle shaped base portion 56. Receptacle shaped base portion 56 is integral with and extends from the receptor portion 40. Base portion 56 includes an annular set of circumferentially arranged teeth 58. Teeth 58 extend for 360 degrees about a circumference of the receptacle shaped base portion 56. Teeth 58 form the bottom edge of a cylindrical circumferential wall of the base portion 56. Teeth 58 are spaced from end wall 49.

First upper connector 22 includes an outer cylinder 60 and an inner cylinder 62 depending from and integral with a ceiling section 64 of the base portion 56. Outer cylinder 60 and inner cylinder 62 are coaxial with base portion 56. Outer cylinder 60 depends to a lower altitude than does inner cylinder 62. An outer surface of outer cylinder 60 is spaced from an inner cylindrical surface of the base portion 56 that forms the teeth 56. The outer surface of inner cylinder 62 is spaced from the inner surface of outer cylinder 60. The inner surface of outer cylinder 60 is threaded with threads 66 to engage the bridge connector 30. Each of the outer and inner cylinders 60, 62 depend to a lower altitude than does the tips of the teeth 58. Inner cylinder 62 is a guide or receptor for the bridge connector 30.

The upper surface of a ceiling section 64 of base portion 56 is smooth and flat and defines a plane with the upper surface of top 42 of the receptor portion 40. Ceiling section 64 of base portion 56 and the outer cylindrical wall having teeth 56 form the shape of a receptacle.

First upper connector 22 further includes a generally triangular shaped transition section 68 that makes the integral connection between the receptor portion 40 and the base portion 56. The transition section 68 includes a depth the same as the base portion 56 to the valleys of the teeth 58, where such valleys of the teeth 58 alternate with the tips of the teeth 58. Transition section 68 includes a ceiling 70 that is flat and smooth and defines a plane with the surface of ceiling section 64 of the base portion 56 and the surface of the top 42 of the receptor portion 40. Ceiling or ceiling section 64, top 42, and ceiling or ceiling section 70 as a whole form a smooth uppermost flat surface of the first upper connector 22.

FIGS. 4A, 4B, 4C and 4D show the second upper connector 24. Second upper connector 24 includes a receptor portion 72 for receiving an end portion of the upper transverse support member 14. Receptor portion 72 includes a top 74, bottom 76, tangential sidewall 78, center sidewall 80, and an end wall 82 that serves as a stop for the end portion of the upper transverse support member 14. Opposite of end wall 82, end surfaces of sidewalls 78, 80 and top wall 74 are tapered such that the sidewalls 78, 80, and top wall 74 lead in gradually to the sidewalls and top wall of the upper transverse support member 14. Opposite of end wall 82, such tapered end surfaces of receptor portion 72 form an opening 84 for receiving the end portion of the upper transverse support member 14. Bottom 76 includes a U-shaped edge 86 that forms a U-shaped recess 88 for receiving one of the generally vertical support members 18 of panel 21. U-shaped recess 88 communicates with opening 84. Bottom 76 further includes an inset pin hole 90, identical in location, structure and function as pin hole 54 of first upper connector 22 shown in FIGS. 3A and 3D, for receiving a pin such as a set pin for engaging the end portion of the upper transverse support member 14 so as to fix the second upper connector 24 to the upper transverse support member 14.

Second upper connector 24 includes an annular shaped base portion 92. Annular shaped base portion 92 is integral with and extends from the receptor portion 72. Base portion 92 includes an annular set of circumferentially arranged teeth 94. Teeth 94 extend for 360 degrees about a circumference of the annular shaped base portion 72. Teeth 94 form the upper edge of a cylindrical circumferential wall of the base portion 92. Teeth 94 are spaced from end wall 82. Teeth 94 of second upper connector 24 engage teeth 58 of first upper connector 22. Teeth 58, 94 are coaxial. Annular shaped base portion 92 includes an annular shaped smooth and flat lowermost surface 95. The bridge connector 30 brings pressure to bear upon this lowermost surface 95.

Second upper connector 24 includes an inner cylinder or annulus 96. Annulus 96 is set inwardly of the base portion 92 by a set of radially extending arms 98 running from the inner cylindrical surface of the annular shaped base portion 92 to the outer cylindrical surface of the annulus 96. Annulus 96 is spaced from annular shaped base portion 92 by the arms 98. The height of the arms 98 is equal to the height of the annulus 96. The height of the annulus 96 and arms 98 is less than the height of the valleys and tips of teeth 94. Teeth 94 project upwardly beyond the uppermost surfaces of the arms 98 and annulus 96. The diameter of the cylindrical inner surface of the annulus 96 is about equal to the diameter of the cylindrical outer surface of the cylindrical wall 60 of first upper connector 22 such that cylinder 60 is stable as cylinder 60 pivots in annulus 96. Annulus 96 defines a through opening 100 for the cylinder 60. Annulus 96 is a guide or receptor for the cylinder 60 of first upper connector 22. Annulus 96 and annular shaped base portion 92 are coaxial. Annulus 96 and arms 98 also have a lowermost smooth and flat surface 97. Surface 97 is coplanar with surface 95 of annular shaped base portion 92. The bridge connector 30 brings pressure to bear upon surfaces 95 and 97 at the same time.

The upper surface of the top 74 of receptor portion 72 is smooth and flat and defines a plane with the upper surface of top 42, ceiling or ceiling section 64, and ceiling or ceiling section 70 of first upper connector 22 when junction apparatus 12 is assembled and when bridge connector 30 is tightened to sandwich base portion 92 of the second upper connector 24 between bridge connector 30 and base portion 56 of the first upper connector 22.

Second upper connector 24 further includes a generally triangular shaped transition section 102 that makes the integral connection between the receptor portion 72 and the annular shaped base portion 92. The transition section 102 includes a depth the same as the base portion 92 to the valleys of the teeth 94, where such valleys of the teeth 94 alternate with the tips of the teeth 94.

FIGS. 5A, 5B, 5C, and 5D show the bridge connector 30. The bridge connector 30 includes an integral first end portion 104, an integral second end portion 106, and an integral radially extending face piece 108 disposed between the end portions 104, 106. The first end portion 104 is cylindrical with exterior threads 110 that engage interior threads 66 of cylinder wall 60 of first upper connector 22.

Bridge connector 30 includes an axially extending through opening 112 that extends through first end portion 104, second end portion 106, and face piece 108. The diameter of through opening 112 is about equal to the outside diameter of inner cylinder 62 of first upper connector 22. First end portion 104 includes an annular tapered surface 114 that serves as a guide for receiving inner cylinder 62 so as to aid in centering inner cylinder 62 and threads 66 of the first upper connector 22 relative to the bridge connector 30. First end portion 104 is a bridge from the upper end 32 of junction support member 20 to the first and second upper connectors 22, 24, which upper end 32 is spaced from the first and second upper connectors 22, 24 when the junction apparatus 12 is assembled.

Face piece 108 is disk shaped. Face piece 108 extends outwardly and radially relative to the first and second end portions 104, 106. Face piece 108 includes an annular channel 116 disposed between an inner annular face 118 and an outer annular face 120. Annular channel 116 receives the cylindrical end portion of cylinder 60. Inner annular face 118 is disposed between cylinders 60 and 62 when the junction apparatus 12 is assembled. Outer annular face 120 brings pressure to bear upon primarily annular lowermost surface 95 of second upper connector 24 but may also bring pressure to bear on annular lowermost surfaces 97 of the arm 98 and annulus 96.

Second end portion 106 of bridge connector 30 is a hand grip. Second end portion or hand grip 106 includes an axial length about the width of a hand of an adult. The axial length of the hand grip 106 is greater than an axial length of the radially extending face piece 108 to the terminal end of the first end portion 104.

The hand grip 106 is roughened to minimize slippage of a human hand turning the hand grip 106. This roughening is attained by the inclusion of a set of axially extending relatively shallow concave grooves 122 spaced apart circumferentially about the hand grip 106. Between two adjacent but spaced apart grooves 122 is an axially extending convex ridge 124 such that hand grip 106 includes an undulating surface extending for 360 degrees about the hand grip 106. The undulating surface undulates from a convex portion to a concave portion to a convex portion, and so on, repeating such pattern.

Through opening 112 includes an inner diameter about equal to the outside diameter of junction support member 20 such that bridge connector 30 is frictionally held at any given vertical position on junction support member 20 while permitting the bridge connector 30 to be rotated on the cylindrical junction support member 20 such that the bridge connector 30 can be turned into and out of the first upper connector 22. However, it should be noted that the diameter of through opening 112 is not constant. The diameter of through opening 112 is slightly less at the upper opening in the first end portion 104 such that the through opening 112 grows gradually smaller as the through opening 112 rises upwardly from the bottom opening in the second end portion 106, through the second end portion 106, through the face piece 108, through the first end portion 104, and out the upper opening in the first end portion 104. Thus, as the bridge connector 30 is placed over the upper end 32 and upper end portion 34 of the junction support member 20, the friction fit between the bridge connector 30 and the junction support member 20 will grow greater as more of the inner surface of the bridge connector 30 comes into contact with the outer surface of the junction support member 20.

It should further be noted that the outside surfaces of the second end portion 106 or hand grip 106 taper slightly inwardly and downwardly as a whole from the underside of the face piece 108 to the lower end of the second end portion 106.

Figure 6A:
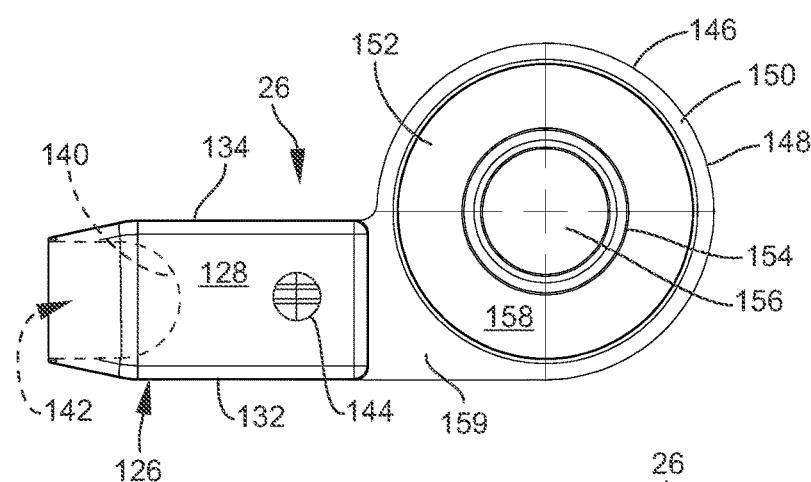
FIG. 6A is a bottom view of the first lower connector of the junction apparatus of FIG. 2A.
Figure 6B:
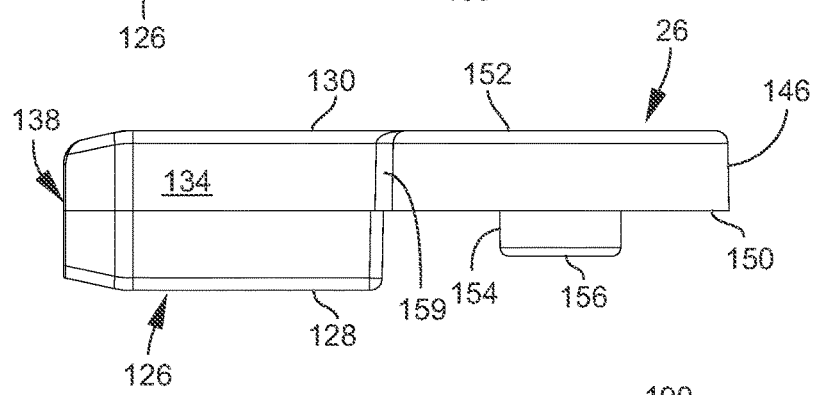
FIG. 6B is a side view of the first lower connector of FIG. 6A.

First lower connector 26 is shown in FIGS. 6A and 6B. First lower connector 26 includes a receptor portion 126 for receiving an end portion of the lower transverse support member 16. Receptor portion 126 includes a top wall 130, bottom wall 128, tangential sidewall 132, center sidewall 134, and an end wall 136 that serves as a stop for the end portion of the lower transverse support member 16. Opposite of end wall 136, end surfaces of sidewalls 132, 134, and bottom wall 128 are tapered such that the sidewalls 132, 134, and bottom wall 128 lead in gradually to the sidewalls and bottom wall of the lower transverse support member 16. Opposite of end wall 136, such tapered end surfaces of receptor portion 126 form an opening 138 for receiving the end portion of the lower transverse support member 16. Top or top wall 130 includes a U-shaped edge 140 that forms a U-shaped recess 142 for receiving one of the generally vertical support members 18 of panel 21. U-shaped recess 142 communicates with opening 138. Bottom wall 128 includes an inset pin hole 144 for receiving a pin such as a set pin for engaging the end portion of the lower transverse support member 16 so as to fix the first lower connector 26 to the lower transverse support member 16.

First lower connector 26 includes a base portion 146. Base portion 146 is integral with and extends from the receptor portion 126. FIG. 6A shows a bottom view of the base portion 146. Base portion includes a circumferential wall 148 having a bottom circumferential face 150. Circumferential wall 148 depends from a ceiling 152 of base portion 146. Base portion 146 further includes a cylinder 154 having an open top end 155 and a closed bottom end 156. The open top end 155 is shown in FIG. 2B. Cylinder 154 receives the bottom end 36 and bottom end portion 38 of the junction support member 20. Cylinder 154 is coaxial with circumferential wall 148 and circumferential face 150. Cylinder 154 depends to a greater depth than does circumferential wall 148. The lower surface of ceiling 152, the inner surface of circumferential wall 148, and the outside wall surface of cylinder 156 forms an annular channel 158. The inside diameter of cylinder 154 is about equal to the outside diameter of junction support member 20.

First lower connector 26 includes a generally triangular shaped transition section 159 that makes the integral connection between the receptor portion 126 and the base portion 146. The transition section 68 includes a depth the same as the cylindrical and circumferential wall 148 of the base portion 146.

Figure 6C:
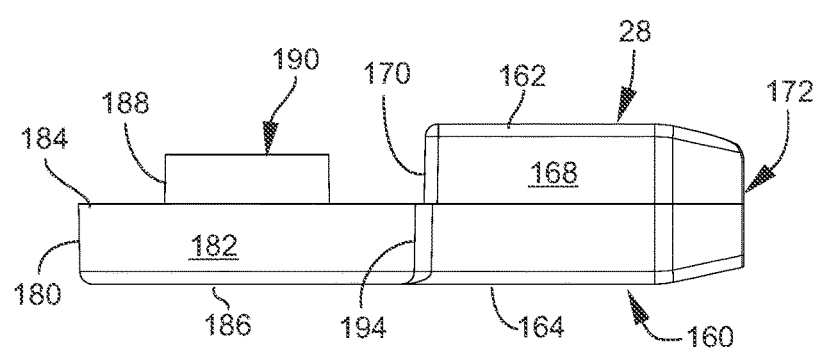
FIG. 6C is a side view of the second lower connector of the junction apparatus of FIG. 2A.
Figure 6D:
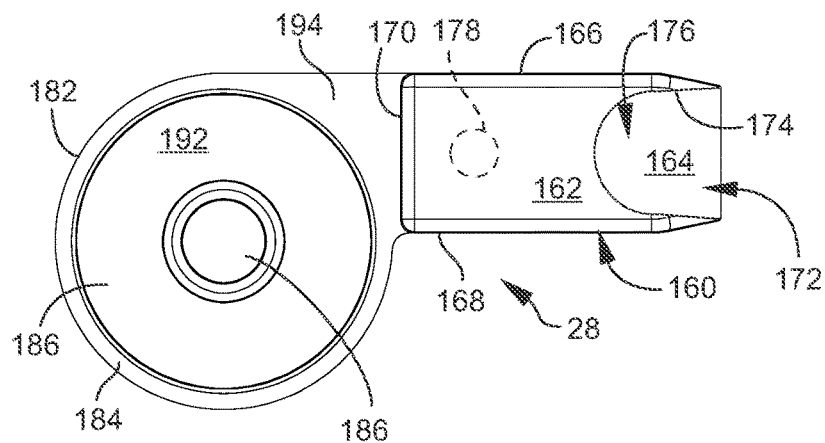
FIG. 6D is a top view of the second lower connector of FIG. 6C.

Second lower connector 28 is shown in FIGS. 6C and 6D. Second lower connector 28 includes a receptor portion 160 for receiving an end portion of the lower transverse support member 16. Receptor portion 160 includes a top wall 162, bottom wall 164, tangential sidewall 166, center sidewall 168, and an end wall 170 that serves as a stop for the end portion of the lower transverse support member 16. Opposite of end wall 170, end surfaces of sidewalls 166, 168, and bottom wall 164 are tapered such that the sidewalls 166, 168, and bottom wall 164 lead in gradually to the sidewalls and bottom wall of the lower transverse support member 16. Opposite of end wall 170, such tapered end surfaces of receptor portion 160 form an opening 172 for receiving the end portion of the lower transverse support member 16. Top or top wall 162 includes a U-shaped edge 174 that forms a U-shaped recess 176 for receiving one of the generally vertical support members 18 of panel 21. U-shaped recess 176 communicates with opening 172. Bottom wall 164 includes an inset pin hole 178 for receiving a pin such as a set pin for engaging the end portion of the lower transverse support member 16 so as to fix the second lower connector 28 to the lower transverse support member 16. Pin hole 178 is identical in location, structure and function to pin hole 144.

Second lower connector 28 includes a base portion 180. Base portion 180 is integral with and extends from the receptor portion 160. FIG. 6D shows a top view of the base portion 180. Base portion includes a circumferential wall 182 having a top circumferential face 184. Circumferential wall 182 rises from a floor 186 of base portion 180. Base portion 180 further includes a cylinder 188 having an open top end 190. The bottom end of cylinder 188 is closed off by the floor 186. The open top end 190 is shown in FIG. 2B. Cylinder 188 receives the cylinder 156 of first lower connector 26. The outside diameter of cylinder 156 is about equal to the inside diameter of cylinder 188 such that the cylinders 156, 188 may rotate relative to each other. When junction apparatus 12 is assembled, the bottom closed end 156 of cylinder 154 is spaced from the floor 186 of second lower connector 28. Cylinder 188 is coaxial with circumferential wall 182 and circumferential face 184. Cylinder 188 rises to a greater height than does circumferential wall 184. The upper surface of floor 186, the inner surface of circumferential wall 182, and the outside wall surface of cylinder 188 forms an annular channel 192. Circumferential faces 150, 184 have the same outside and inside diameters such that, when junction apparatus 12 is assembled, the circumferential face 150 of first lower connector 26 rides on the circumferential face 184 of second lower connector 28. Circumferential faces 150, 184 are coaxial with each other when the junction apparatus 12 is assembled.

First lower connector 28 includes a generally triangular shaped transition section 194 that makes the integral connection between the receptor portion 160 and the base portion 180. The transition section 194 includes a depth the same as the cylindrical and circumferential wall 182 of the base portion 180.

Figure 7:
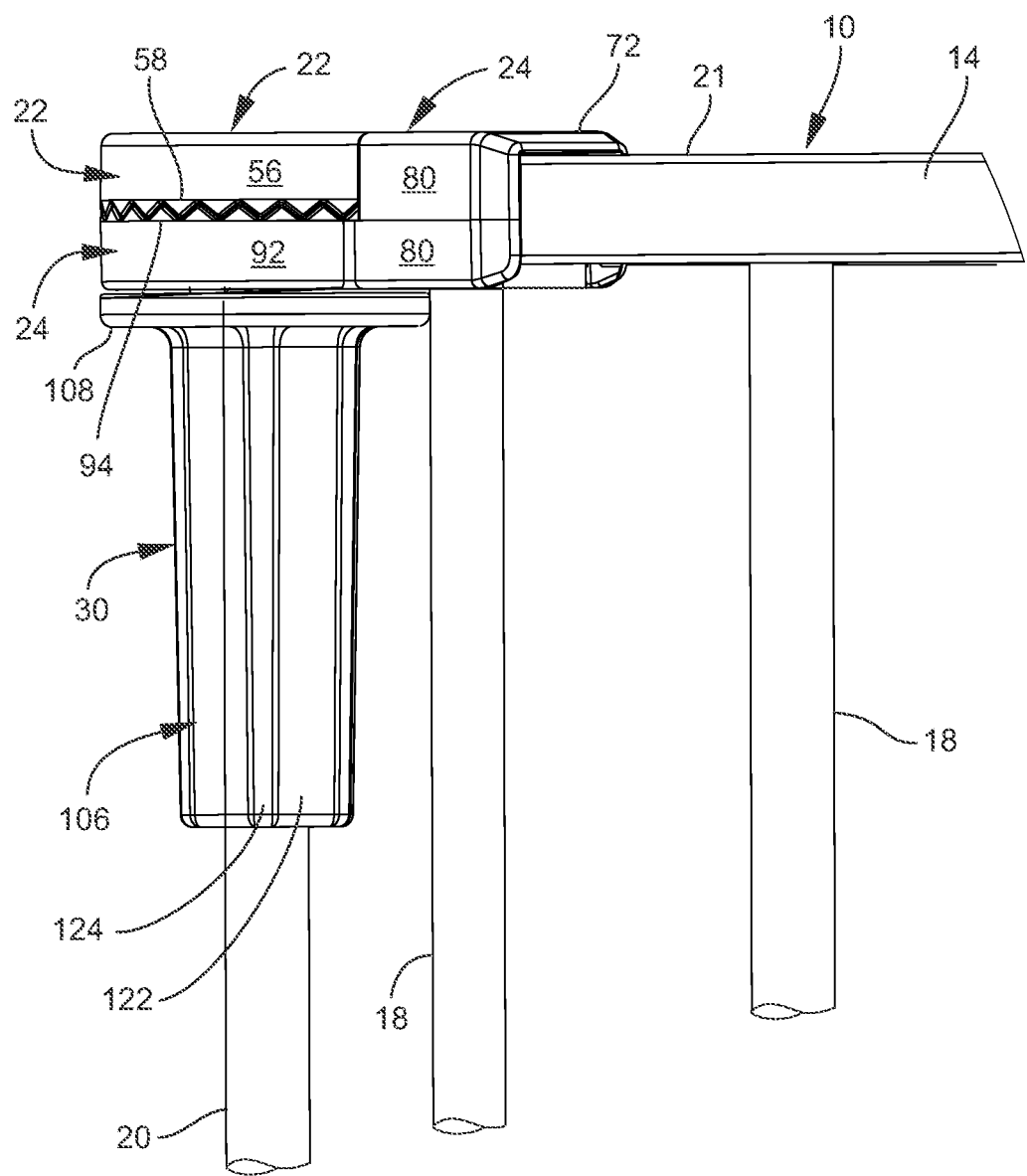
FIG. 7 is a side view of a top portion of the junction apparatus of FIG. 2A engaged to the barrier of FIG. 1A, showing the second upper connector pinched between the first upper connector and the bridge connector.
Figure 10:
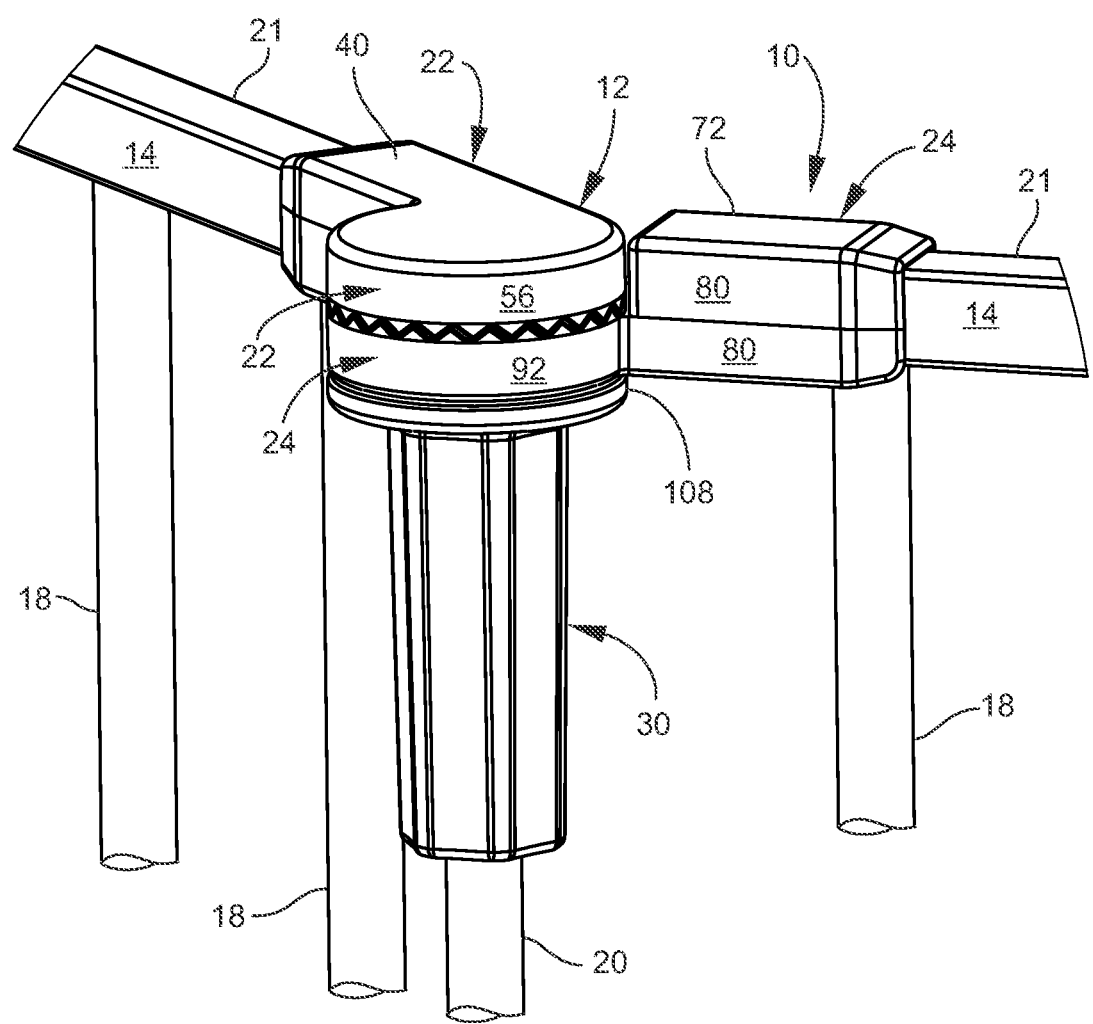
FIG. 10 is a front view of a top portion of the junction apparatus of FIG. 2A engaged to the barrier of FIG. 1A, showing the second upper connector pinched between the first upper connector and the bridge connector.
Figure 12:
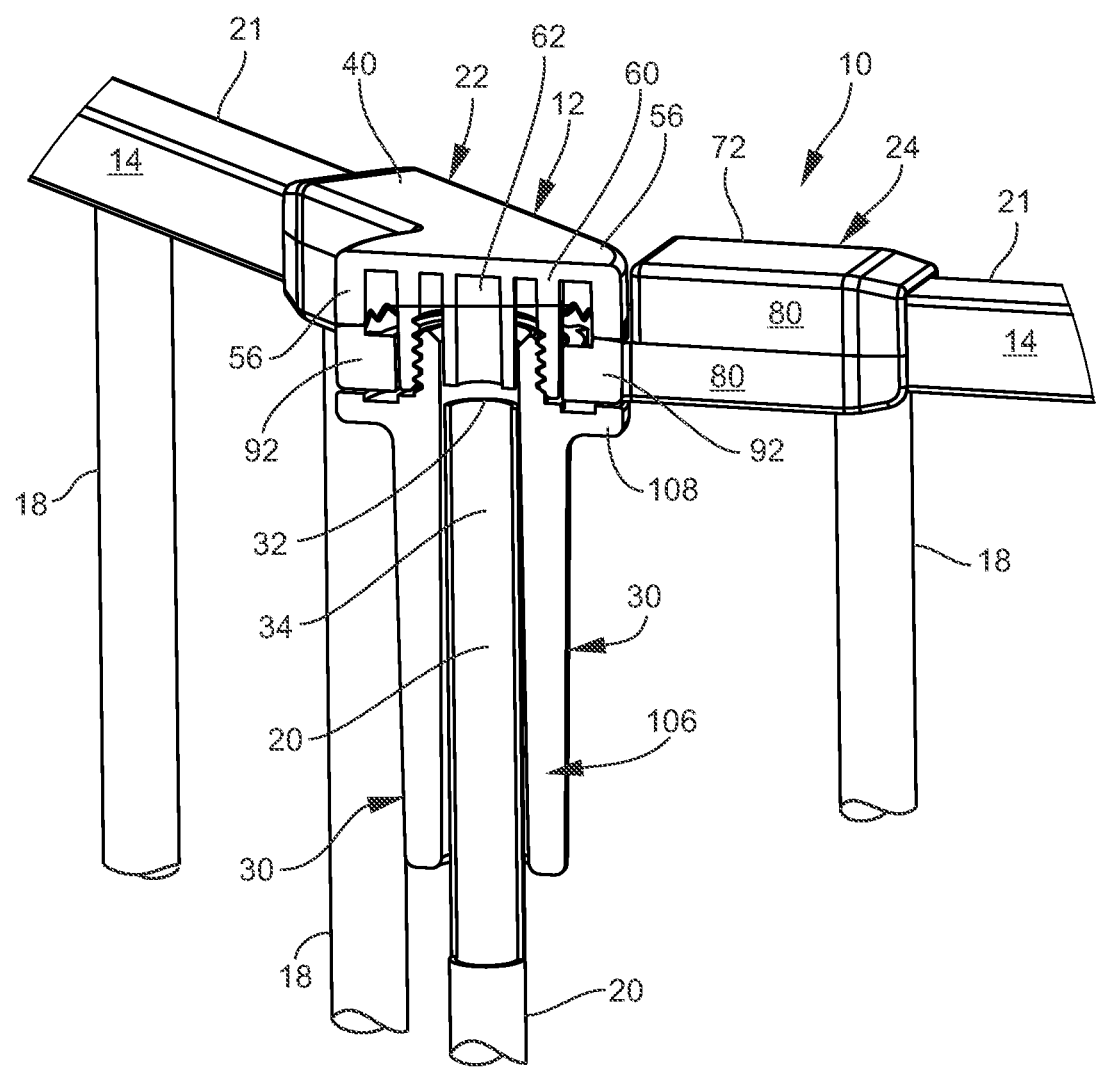
FIG. 12 is a front, partially section view of a top portion of the junction apparatus of FIG. 2A engaged to the barrier of FIG. 1A, showing the second upper connector pinched between the first upper connector and the bridge connector.

FIGS. 7, 10 and 12 show the base portion 92 of connector 24 sandwiched between the base portion 56 of connector 22 and the face piece 108 of the bridge connector 30. In such a position, the outer annular face 120 of the face piece 108 brings pressure to bear upon the lowermost surface or annular face 95 of base portion 92 of connector 24 by the threads 110 of the bridge connector 30 engaging the threads 66 of the base portion 56 to draw the base portion 56 relatively toward the face piece 108, which causes teeth 58, 94 to engage with pressure, which causes first and second connectors 22, 24 to lock together against pivotal movement, which causes adjacent panels 21 to lock together at a certain angle. In this position, where the junction assembly 12 is fully engaged and locked against pivoting, the upper end 32 of the junction support member 20 is spaced from and adjacent to the lowermost surface or underside annular face 95 of the base portion 92 of the second upper connector 24. The upper end 32 of the junction support member 20 is also spaced from and adjacent to the lowermost end of the inner cylinder 62 of the first upper connector 22, as shown in FIG. 12.

FIG. 8 shows the bridge connector 30 having been disengaged from the first upper connector 22 and having been slid out of and away from the second upper connector 22. After being disengaged from the first upper connector 22 by being turned so that the threads 66, 110 disengage from each other, the bridge connector 30 is slid down the junction support member 20. In this position, the first and second upper connectors 22, 24 can pivot relative to each other such that adjacent panels 21 can swing relative to each other. In this position, the junction support member 20 can be removed from the barrier 10 because the upper end 32 of the junction support member 20 clears the lowermost surface or annular under face 95 of the base portion 92 of the second upper connector 24. With the junction support member 20 removed, a break in the barrier 10 may be made. With one or more junction support members 20 removed, panels 21 can be replaced or panels 21 having connectors 22, 24, 26, 28 with different angles can be employed. With the junction support member 20 removed, a new junction support member 20 can be put in place. The junction support member 20 may be left in place and, with the threads 66, 110 merely loosened, the first and second upper connectors 22, 24 can be pivoted relative to each other to thereby swing adjacent panels 21 relative to each other. It should be noted that the first and second lower connectors 26, 28 are following connectors that have no teeth, such that when panels 21 are swung, first and second lower connectors 26, 28 follow such swinging to swing to the locations dictated by their respective first and second upper connectors 22, 24.

FIG. 9 shows that the junction support member 20 and the bridge connector 30 may be tilted away from its generally vertical position engaged between first and second upper connectors 22, 24 on the one hand and first and second lower connectors 26, 28 on the other hand. When junction support member 20 and bridge connector 30 are tilted, the lower end portion 38 of the junction support member 20 tilts in its receptor or cylinder 154 of first lower connector 26. After such tilting so as to move the upper end 32 of the junction support member 20 away from first and second upper connectors 22, 24, the lower end 36 of the junction support member 20 may be lifted out of receptor or cylinder 154 of the first lower connector 26.

Figure 11:
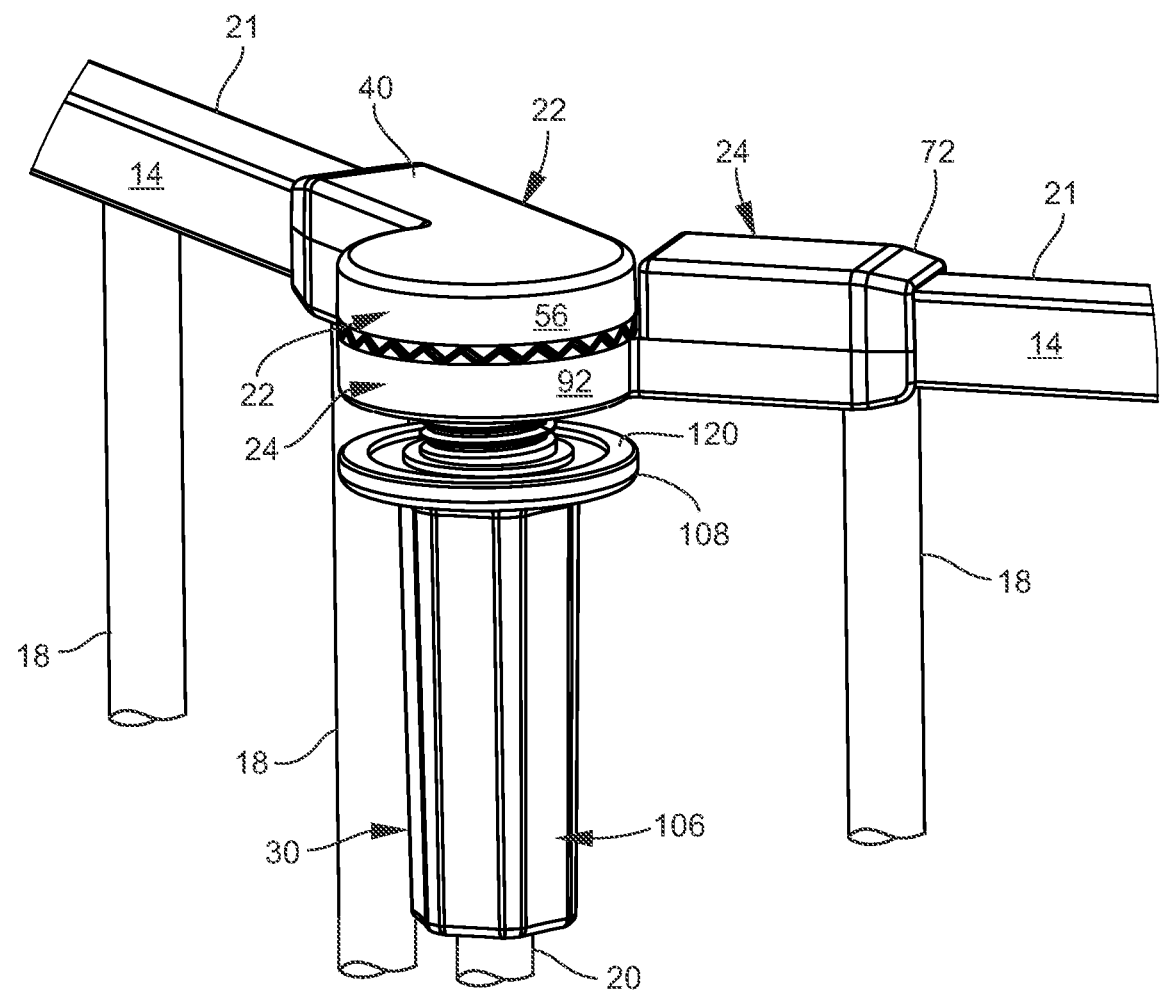
FIG. 11 is a front view of a top portion of the junction apparatus of FIG. 2A, showing the bridge connector partially disengaged from the first and second upper connectors.

FIGS. 11 and 13 show that the bridge connector 30 has been disengaged from the first upper connector 22 but has not yet been slid down the junction support member 20. The upper end 32 of the junction support member 20 remains spaced from and adjacent to the first and second upper connectors 22, 24 by, for example, being spaced from and adjacent to the lower end of the inner cylinder 62 and, for example, being spaced from and adjacent to the annular under surface 95 of base portion 92 of second upper connector 24.

Figure 1B:
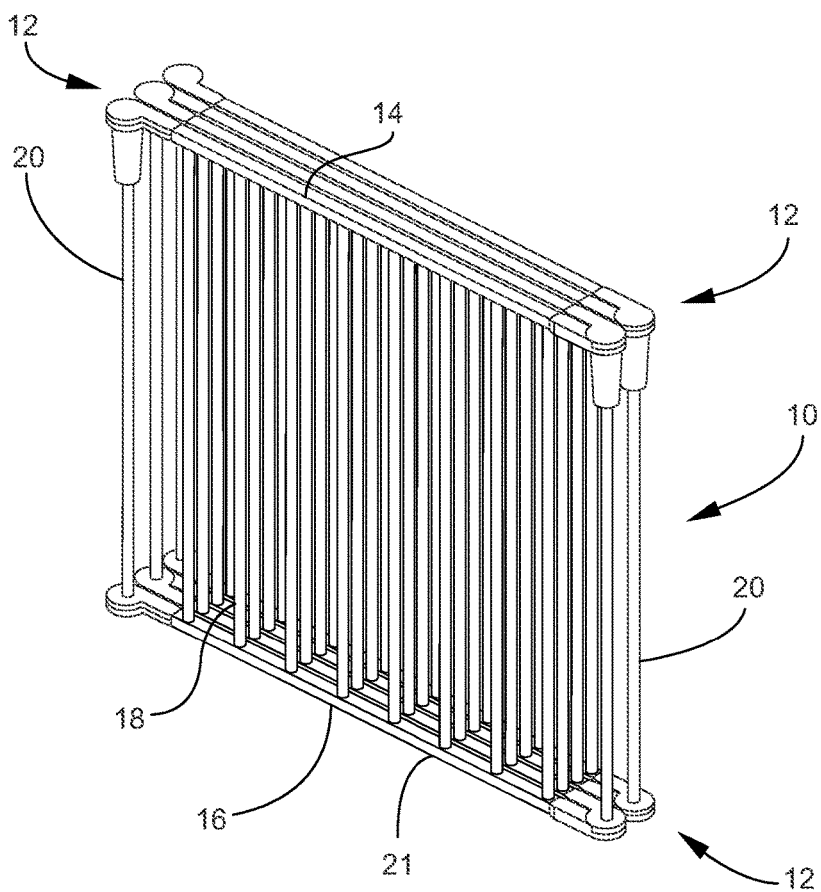
FIG. 1B is a perspective view of the barrier of FIG. 1A where the barrier is in a folded in or retracted configuration.
Figure 4A:
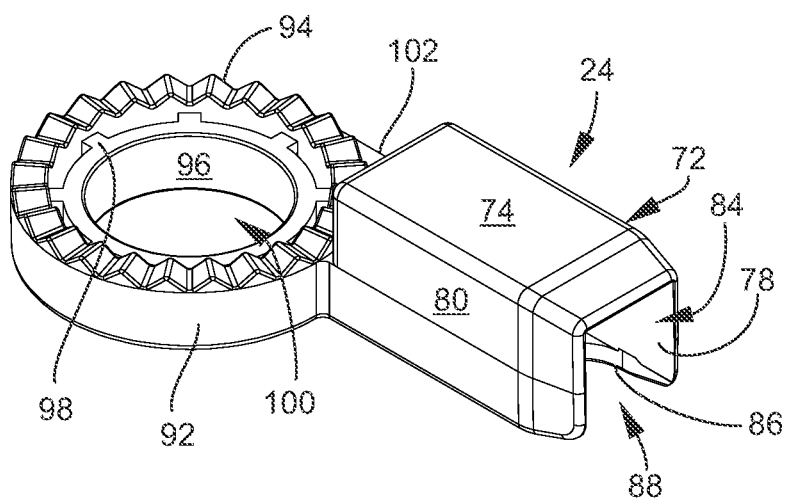
FIG. 4A is a perspective view of the second upper connector of the junction apparatus of FIG. 2A.
Figure 4B:
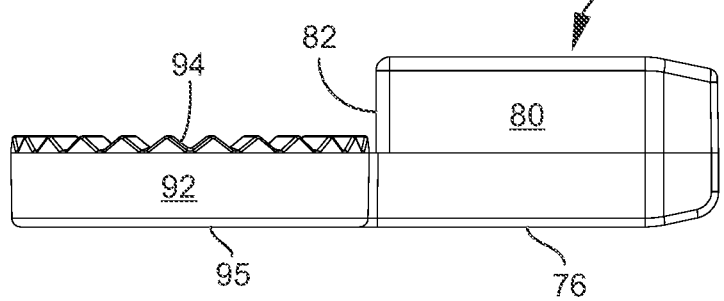
FIG. 4B is a side view of the second upper connector of FIG. 4A.
Figure 4C:
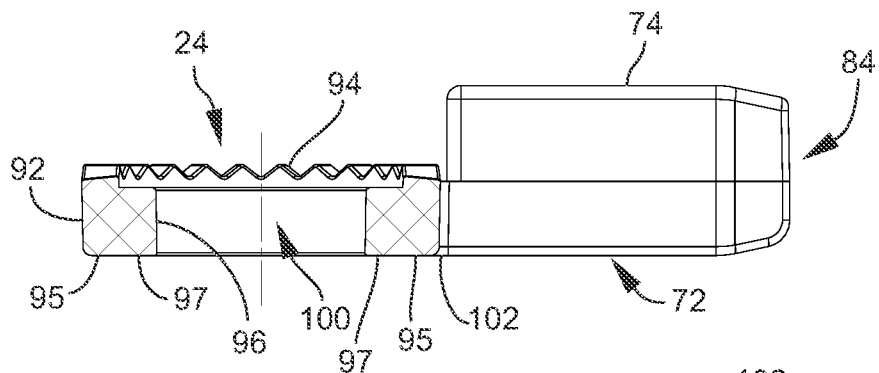
FIG. 4C is a side, partially section view of the second upper connector of FIG. 4A.
Figure 4D:
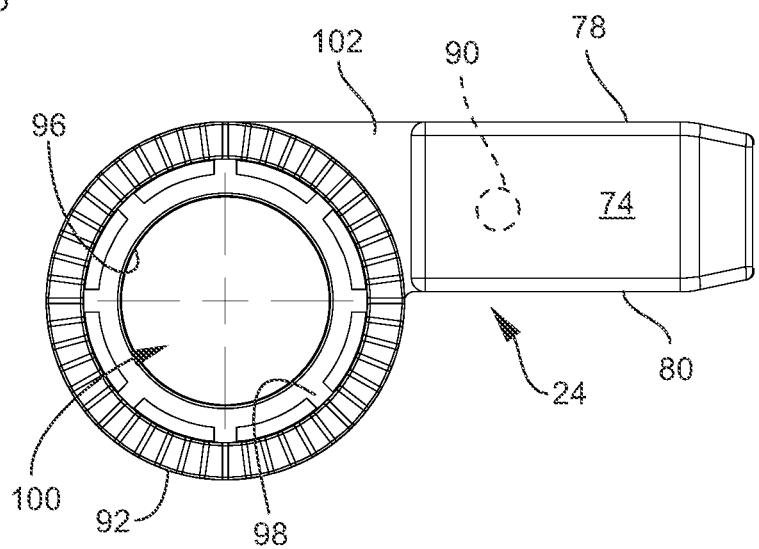
FIG. 4D is a top view of the second upper connector of FIG. 4A.

The junction apparatus 12 includes a first upper connector 22 having tangential side or wall 46 and a center side or wall 48, a second upper connector 24 having a tangential side or wall 78 and a center side or wall 80, a first lower connector 26 having a tangential side or wall 132 and a center side or wall 134, and a second lower connector 28 having a tangential side or wall 166 and center side or wall 168. Such sides or walls are sides or walls of the receptor portions 40, 72, 126, and 160. The tangential sides define planes that relate to or intersect their respective base portions 56, 92, 146, 180 tangentially. The walls define planes that interest the center or central point of their respective base portions 56, 92, 146, 180. Such tangential and center point relationships mean that adjacent panels 21 can swing to a position where the panels 21 may be disposed in planes parallel to each other, as shown in FIG. 1B, where the center sides of walls of such receptors of adjacent connectors are swung to confront each other in a parallel and adjacent manner. When the connectors are swung the other way, the respective tangential sides may come to a stop at a right angle, or about at a right angle to each other, such that adjacent panels 21 may have a range of swinging of about 270 degrees.

In operation, barrier 10 may arrive to the end user in the form shown in FIG. 1B with the junction apparatus 12 engaged to the panels 21. If so, then the bridge connectors 30 are likely fairly tight so as to prevent an unintended unfolding of the barrier 10 from the compact position shown in FIG. 1B. To unfold the barrier 10 from such compact position, the bridge connectors 30 are turned or rotated so as to loosen the engagement between teeth 58, 94. To swing adjacent panels 21 relative to each other, it is not necessary that the bridge connector 30 be fully disengaged from the first upper connector 22. When the panels 21 are swingable relative to each other, the barrier 10 may be unfolded from the compact position of FIG. 1B to the folded out operating position shown in FIG. 1A.

Then, to make barriers or fences or enclosures, the junction apparatus 12 comes into play. For example, to make a four panel enclosure from the form shown in FIG. 1A, junction support member 20 is removed from one of the end junction apparatus 12 shown in FIG. 1A. As to the other junction support member 20, such is left in place with its respective bridge connector 30 disengaged from its respective connector and slid partially down the junction support member 20. Then the free first upper connector 22 from the right hand side of FIG. 1A is joined to the free second upper connector 24 from the left hand side of FIG. 1A. At the same time the free first lower connector 26 from the right hand side of FIG. 1A is joined to the free second lower connector 28 from the left hand side of FIG. 1A. At this time a generally square enclosure is formed by the four panels 21. Then the bridge connector 30 from the remaining junction apparatus 12 is slid up the junction support member 20, over the gap between the end 32 of the junction support member 20 and the first and second upper connectors 22, 24, and engaged to the first upper connector 22, squeezing the base portion 92 of the second upper connector 24 therebetween. The other three bridge connectors 30 of the other three junction apparatus 12 are then tightened to form the square enclosure.

In the state such as FIG. 1A, or in the state of such square enclosure described above, or even in the folded state as shown in FIG. 1B, the junction support member 20 is not called upon to carry a vertical load. Such is the duty of vertical support members 18 that are engaged between the upper and lower transverse members 14, 16. Instead, the junction support member 20 in combination with the bridge connector 30 is called upon to resist a transverse or horizontal force such as where a pet tries to force itself through the enclosure by pushing against or pulling on a junction support member 20. And the duty of the junction apparatus 12 is to provide the point where the barrier 10 or enclosure can be opened up or closed down, where the barrier 10 or enclosure can be made to form a greater or lesser angle of fencing, or where the barrier 10 or enclosure is to be folded from the form shown in FIG. 1A to the form shown in FIG. 1B.

To remove a junction support member 20 from the barrier 10, such as from the above referenced square enclosure, any of the bridge connectors 30 may be turned so as to disengage the bridge connector 30 from the first upper connector 22 and draw the head or first end portion 104 of the bridge connector 30 to or downwardly of the end 32 of the junction support member 20. Then the end 32 of the junction support member 20, already spaced and always spaced from the first and second upper connectors 22, 24, can be tilted away from the first and second upper connectors 22, 24 and lifted out of the first lower connector 26, whereupon the first and second upper connectors 22, 24 can be taken apart and whereupon the first and second lower connectors 26, 28 can be taken apart. Or, it should be noted, the bridge connector 30 can be screwed back into the first upper connector 22, squeezing the second upper connector 24 therebetween, without the junction support member 20 being engaged in the bridge connector 30. With the bridge connector 30 screwed back in, the adjacent panels 21 are tied to each other, and this tie keeps the lower connectors 26, 28 engaged to each other without the junction support member 20 between the upper connectors 22, 24 and lower connectors 26, 28.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:
1. A barrier comprising:
a) a first barrier portion;
b) a second barrier portion;
c) a junction apparatus engaging the first and second barrier portions to each other, the junction apparatus comprising:
  i) a first upper connector engaged to the first barrier portion;
  ii) a second upper connector engaged to the second barrier portion;
  iii) the first and second upper connectors being pivotally engaged to each other;
  iv) a first lower connector engaged to the first barrier portion;
  v) a second lower connector engaged to the second barrier portion;
  vi) the first and second lower connectors being pivotally engaged to each other;
  vii) a junction support member between the first and second upper connectors and the first and second lower connectors, the junction support member having an upper end and a lower end, the upper end of the junction support member being spaced from and adjacent to the first and second upper connectors;

viii) a bridge connector axially receiving the junction support member, the bridge connector extending from the junction support member to the first and second upper connectors;

d) wherein the bridge connector comprises first and second end portions and a radially extending face between the end portions, one end portion comprising a threaded bridge portion, wherein the second connector comprises an opening, and wherein the first connector comprises a first connector threaded portion, the threaded bridge portion being insertable through the opening of the second connector and into turnable engagement with the first connector threaded portion, the radially extending face and the first upper connector pinching the second upper connector therebetween to fix the first and second upper connectors to each other to minimize pivotal movement between the first and second upper connectors;

e) wherein the lower end of the junction support member is seatable in and unseatable from one of the first and second lower connectors, the upper end of the junction support member being disengaged from each of the first and second upper connectors at all times such that, when the bridge connector is disengaged from the first upper connector, the junction support member can be disengaged from the barrier;

f) wherein the upper end of the junction support member is spaced from and adjacent to the second upper connector when the threaded bridge portion is engaged with the first connector threaded portion; and g) wherein the bridge connector is slideable such that the first and second end portions in their entirety are configured to be located intermediate the upper and lower ends of the junction support member when the threaded bridge portion is disengaged from the first connector threaded portion.

2. The barrier of claim 1, wherein the first upper connector includes a first set of teeth and wherein the second upper connector includes a second set of teeth, each of the first and second sets of teeth being annularly arranged, the first and second sets of teeth interacting with each other such that, when the first and second sets of teeth are pivoted relative to each other, the first and second barrier portions are set at different angles relative to each other.

3. The barrier of claim 1, wherein the second end portion of the bridge connector comprises a hand grip for turning the bridge connector into and out of the first upper connector.

4. The barrier of claim 3, wherein said axial length of said hand grip is greater than an axial length from the radially extending face to a terminal end of said threaded bridge portion.

5. The barrier of claim 4, wherein the hand grip includes a set of axially extending grooves spaced apart about the hand grip to minimize slippage of a human hand turning the hand grip.

6. The barrier of claim 1, wherein the junction support member comprises a tube.

7. The barrier of claim 1, wherein one of the first and second lower connectors includes a seat for the second end of the junction support member, the seat being cylindrical, the seat being disposed in a cylindrical portion of the other of the first and second lower connectors.

8. A barrier comprising:
a) a first barrier portion;
b) a second barrier portion;
c) a junction apparatus engaging the first and second barrier portions to each other, the junction apparatus comprising:
  i) a first upper connector engaged to the first barrier portion;
  ii) a second upper connector engaged to the second barrier portion;
  iii) the first and second upper connectors being pivotally engaged to each other;
  iv) a first lower connector engaged to the first barrier portion;
  v) a second lower connector engaged to the second barrier portion;
  vi) the first and second lower connectors being pivotally engaged to each other;
  vii) a tube between the upper connectors and the lower connectors, the tube having an upper end and a lower end, the upper end of the tube being spaced from first and second upper connectors, the lower end of the tube being seated in one of the first and second lower connectors;
  viii) a bridge between the upper end of the tube and one of the first and second upper connectors, the bridge being removable from said one of the first and second upper connectors, the upper end of the tube being spaced from and adjacent to the second upper connector when the bridge is engaged to the first upper connector; and
  ix) wherein the bridge receives the tube in a bridge through opening, the bridge through opening including a first inner diameter about equal to an outer diameter of the tube such that the bridge is frictionally held at any given vertical position on the tube, the bridge through opening having an upper portion where a second inner diameter is slightly less than the first inner diameter.

9. The barrier of claim 8, wherein the bridge axially receives the tube and wherein the bridge threadingly engages the first upper connector.

10. The barrier of claim 8, wherein, when the bridge is removed from the first upper connector, the tube is tiltable relative to said one of the first and second lower connectors.

11. The barrier of claim 8, wherein, when the bridge is removed from the first upper connector, the tube is liftable out of said one of the first and second lower connectors.

12. The barrier of claim 8, wherein said lower end of the tube includes a cylindrical portion, wherein said one of the first and second lower connectors includes a cylindrical portion, and wherein said cylindrical portion of said lower end of the tube is seated in said cylindrical portion of said one of the first and second lower connectors.

* * * * *